(12) United States Patent
Reiss

(10) Patent No.: US 6,976,774 B2
(45) Date of Patent: *Dec. 20, 2005

(54) COMBINED CARGO LAMP AND CENTER HIGH MOUNTED STOP LAMP ASSEMBLY FOR VEHICLES

(75) Inventor: Benoit Reiss, Columbus, IN (US)

(73) Assignee: Osram Sylvania Inc.

( * ) Notice: Subject to any disclaimer, the term of this patent is extended or adjusted under 35 U.S.C. 154(b) by 177 days.

This patent is subject to a terminal disclaimer.

(21) Appl. No.: 10/649,897

(22) Filed: Aug. 26, 2003

(65) Prior Publication Data

US 2005/0047157 A1    Mar. 3, 2005

(51) Int. Cl.[7] .............................................. B60Q 1/26
(52) U.S. Cl. ....................... 362/541; 362/487; 362/522; 362/545
(58) Field of Search ........................ 362/487, 540–549, 362/485, 522; 340/479, 464, 468

(56) References Cited

U.S. PATENT DOCUMENTS

| | | | | |
|---|---|---|---|---|
| 4,891,625 A | | 1/1990 | VanRiper et al. ............ 340/479 |
| 4,896,136 A | * | 1/1990 | Hotovy ........................ 340/479 |
| 4,935,665 A | * | 6/1990 | Murata ........................ 313/500 |
| 5,211,466 A | * | 5/1993 | Jarocki et al. .............. 362/540 |
| 5,241,457 A | * | 8/1993 | Sasajima et al. ............ 362/503 |
| 5,839,231 A | * | 11/1998 | Gebhart et al. .............. 49/413 |
| 6,015,223 A | * | 1/2000 | Kidd et al. ................. 362/503 |
| 6,086,230 A | | 7/2000 | Wooldridge et al. ........ 362/503 |
| 6,509,832 B1 | * | 1/2003 | Bauer et al. ............. 340/425.5 |
| 6,561,689 B1 | * | 5/2003 | Kidd et al. ................. 362/541 |
| 6,773,154 B2 | * | 8/2004 | Desai ......................... 362/541 |
| 6,827,475 B2 | * | 12/2004 | Vetorino et al. ............ 362/545 |
| 6,851,839 B2 | * | 2/2005 | Malone et al. .............. 362/487 |

* cited by examiner

*Primary Examiner*—Stephen Husar
*Assistant Examiner*—Jason Han
(74) *Attorney, Agent, or Firm*—Carlo S. Bessone

(57) ABSTRACT

A combined assembly of a center high mounted stop lamp (CHMSL) assembly and a cargo lamp assembly for a vehicle including a housing having compartments including at least one compartment for housing a CHMSL component and having a stop lens. The housing further includes left and right compartments, respectively on opposite sides of the CHMSL compartment, each having a cargo light lens and a white LED for directing a beam of light to the respective cargo light lens. Each of the cargo lamp assemblies includes one of the cargo lenses and one of the LEDs, the LEDs each having an aperture for emitting the light beam in an arc of about 120° in horizontal and vertical planes, and each of the cargo lenses being adapted to reduce the light beam in a horizontal plane to about 60° and reducing the light beam in a vertical plane to about 60°.

9 Claims, 2 Drawing Sheets

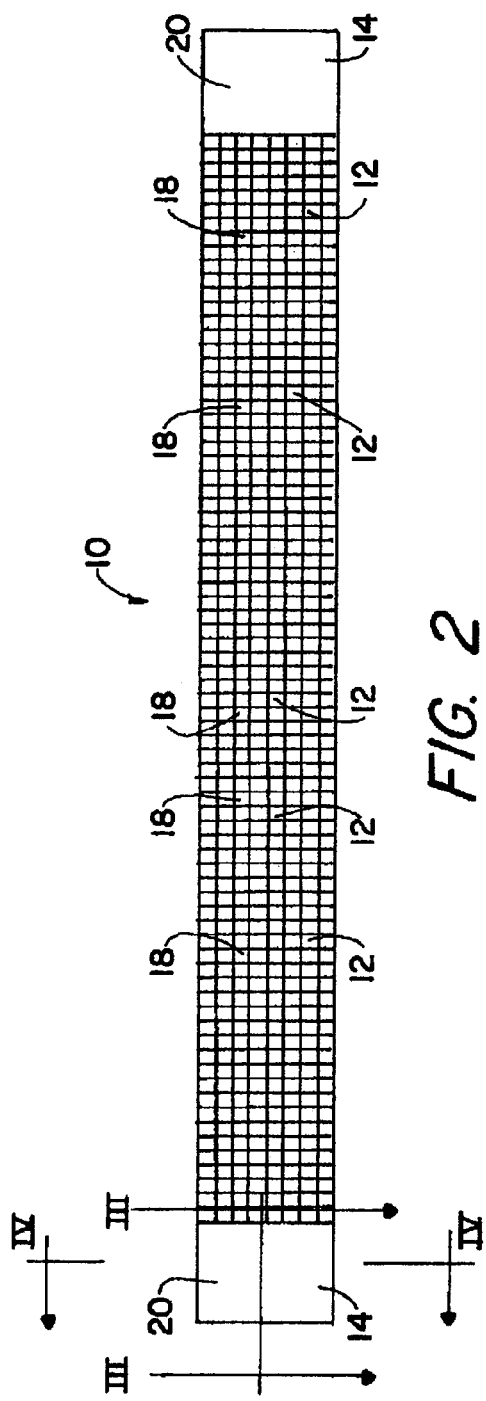
FIG. 2
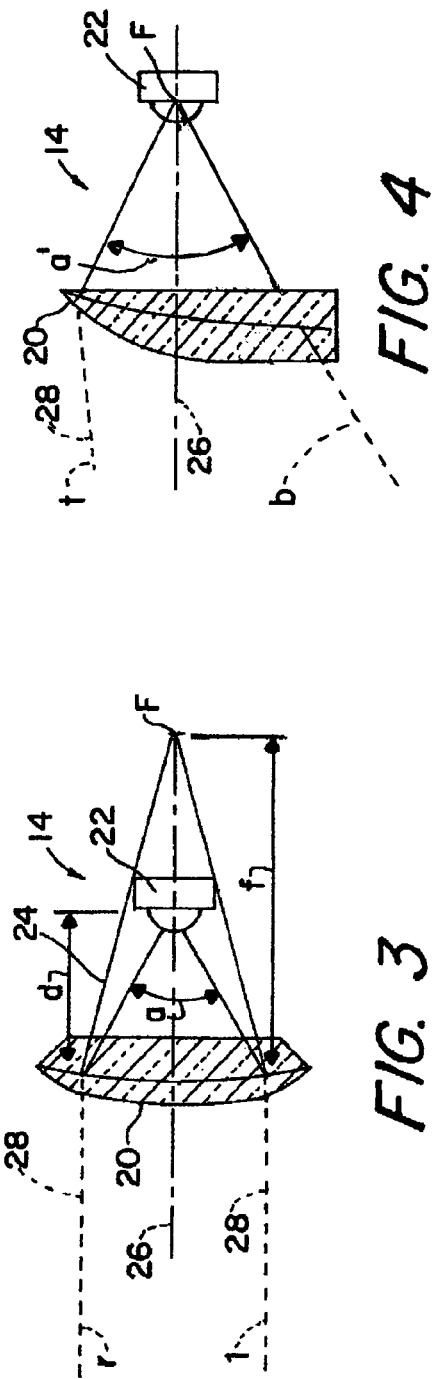
FIG. 3
FIG. 4

COMBINED CARGO LAMP AND CENTER HIGH MOUNTED STOP LAMP ASSEMBLY FOR VEHICLES

BACKGROUND OF THE INVENTION

1. Field of the Invention

The invention relates to lamp units for vehicles and is directed more particularly to a cargo lamp assembly featuring a light emitting diode, and to a combination of such an assembly with a center high mounted stop lamp assembly.

2. Description of the Prior Art

Combined cargo lamp and center high mounted stop lamp assemblies are generally known. In U.S. Pat. No. 4,891,625, issued Jan. 2, 1990 to Bradley C. Van Riper et al, there is shown and discussed a combined center high mounted stop lamp and cargo lamp assembly for pick-up trucks, vans, and the like. The assembly includes a housing for three side-by-side lamps. Each lamp features an incandescent bulb and a parabolic reflector, and an appropriate lens, red for the stop lamp lens and clear for the cargo lamp lenses.

Another combined cargo lamp and stop lamp is shown and described in U.S. Pat. No. 6,086,230, issued Jul. 11, 2000 to George Wooldridge et al. In this instance, the combination is adapted for disposition on a rear cargo door of a panel truck, sport utility vehicle, or the like, wherein a rear cargo door is pivotally mounted on a side edge thereof. The combination features two lamps, a stop lamp for exhibiting a stop-signal, and a cargo lamp for lighting the interior of the vehicle. The assembly features various types of incandescent light bulbs, such as snap-in, plug in and/or hard wired.

The use of incandescent bulbs presents a number of problems. Their size requires an appropriately sized housing. Their life duration requires periodic replacement and can lead to loss of use at inopportune times. Replacement requires service access facility. In some instances, the temperature of functioning incandescent bulbs, particularly in large numbers, can result in problems relative to temperature-sensitive cargo.

Thus, there is a need for a cargo lamp assembly for vehicles, which assembly is devoid of incandescent bulbs and, rather, relies upon light emitting diodes (LED) for optical enhancement of a cargo area.

There is further a need for such a cargo lamp assembly in combination with a center high mounted stop lamp assembly, the latter being of either a traditional structure or of an LED based structure.

SUMMARY OF THE INVENTION

Accordingly, an object of the invention is to provide a cargo lamp assembly for vehicles, the lamp including a white light emitting diode and a lens for appropriately configuring the beam of light emitted by the diode.

A further object of the invention is to provide a combined cargo lamp assembly, as set forth immediately above, and stop light assembly for vehicles.

With the above and other objects in view, a feature of the invention is the provision of a cargo lamp assembly for vehicles. The assembly comprises a white light emitting diode having an aperture for emitting a light beam in an arc of 120° in a horizontal plane, and 120° in a vertical plane, and a lens for receiving the beam and reducing the beam to about 60° in the horizontal plane and in the vertical plane.

In accordance with a further feature of the invention, there is provided a cargo lamp assembly for vehicles. The assembly comprises a white light emitting diode (LED) having an aperture for emitting a light beam in an arc of x° to the left and x° to the right of a central axis of the beam in a horizontal plane, and a lens for reducing the beam to an arc of about ½x° to the left and about ½x° to the right of the central axis, the lens being configured in horizontal cross section to provide a lens focal point about twice the distance from the lens as the distance of the LED from the lens.

In accordance with a further feature of the invention, there is provided a cargo lamp assembly for vehicles. The assembly comprises a white LED having an aperture for emitting a light beam in an arc of y° above and y° below a central axis of the beam in a vertical plane, and a lens for reducing the beam to an arc including in the vertical plane an upper boundary deflected downwardly about 10° relative to a horizontal plane, and a lower boundary of about ½y°+10°, the lens being configured in vertical cross section to provide a lens focal point coincident with the distance from the lens to the LED.

In accordance with a still further feature of the invention, there is provided a combined assembly of a center high mounted stop lamp (CHMSL) assembly and a cargo lamp assembly for a vehicle. The combined assembly comprises a housing for mounting on a rearwardly facing wall surface of a body portion of the vehicle proximate a top thereof and proximate a transverse center of the vehicle, the housing having compartments including at least one compartment for housing a CHMSL component and having a stop lens. The housing further includes left and right compartments, respectively on opposite sides of the CHMSL compartment, each having a cargo light lens and a white LED for directing a beam of light to the respective cargo light lens. Each of the cargo lamp assemblies comprises one of the cargo lenses and one of the LEDs, the LEDs each having an aperture for emitting the light beam in an arc of about 120° in horizontal and vertical planes, and each of the cargo lenses being adapted to reduce the light beam in a horizontal plane to about 60° and reducing the light beam in a vertical plane to about 60°.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings:

FIG. 2 is a rear elevational view of the combined assemblies of FIG. 1;

FIG. 3 is a diagrammatic view of a cargo lamp assembly, including a sectional view of a lens portion of the assembly taken along line III—III of FIG. 2; and illustrative of an embodiment of the invention; and FIG. 4 is a diagrammatic view of the cargo lamp assembly of FIG. 3, including a sectional view of the lens portion of the assembly taken along line IV—IV of FIG. 2.

DESCRIPTION OF THE PREFERRED EMBODIMENTS

Figure 1:
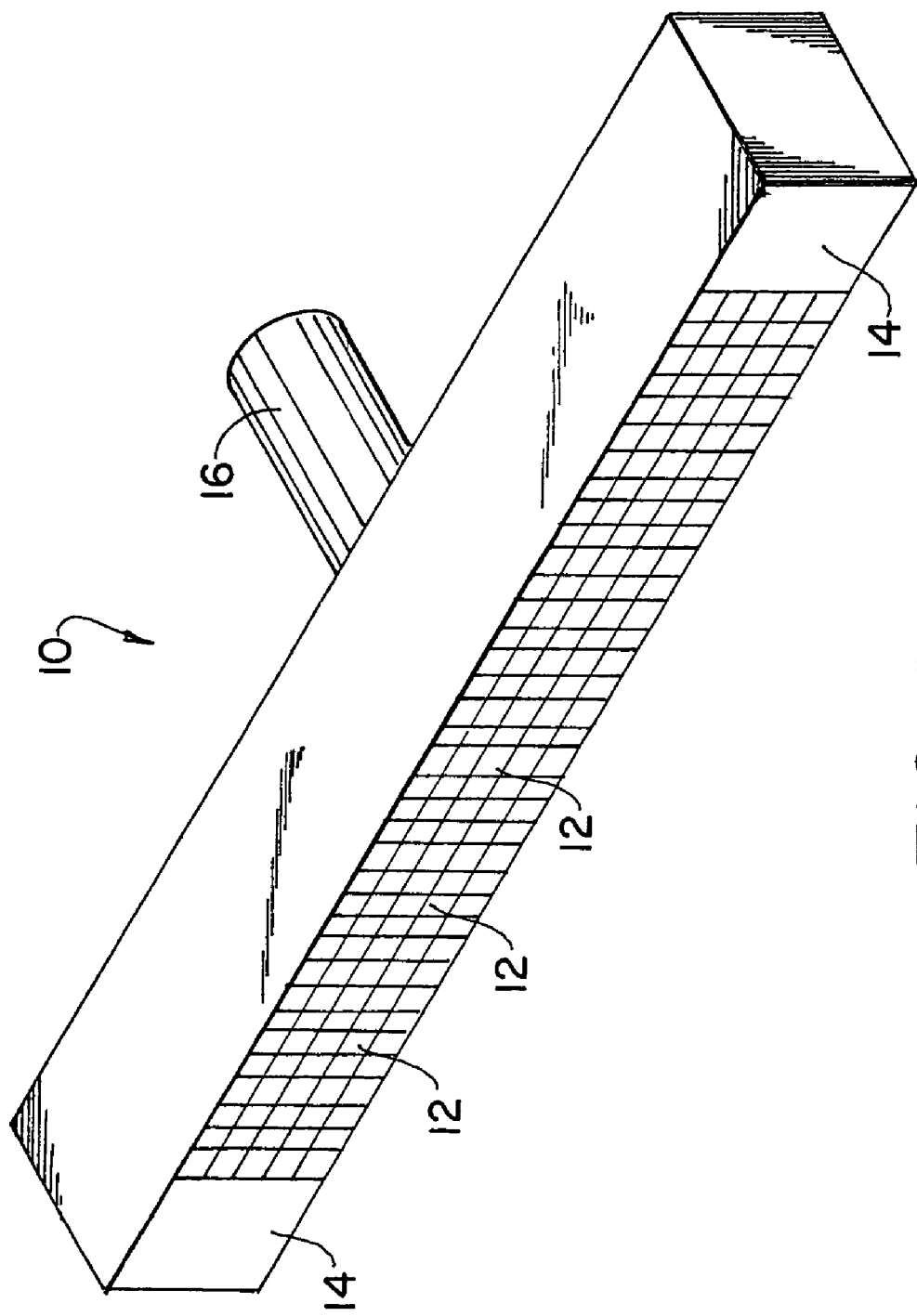
FIG. 1 is a perspective view of one form of combined center high mounted stop lamp assemblies and cargo lamp assemblies illustrative of an embodiment of the invention.

Referring to FIGS. 1 and 2, it will be seen that an illustrative embodiment of the invention includes a housing 10 for one or more center high mounted stop lamp (CHMSL) assemblies 12 and one or more cargo lamp assemblies 14. As illustrated in FIGS. 1 and 2, the combined assemblies typically include a series of the side-by-side stop lamp assemblies 12 and a cargo light assembly 14 on opposite ends of the series of stop lamp assemblies.

The housing 10 typically is mounted, as by a connector 16 (FIG. 1), to a rearwardly facing wall surface of a body portion of a vehicle (not shown), such as a pick-up truck, or the like, the housing being mounted proximate a transverse center of the vehicle. The stop lamp assemblies 12 are each provided with a stop lamp lens 18, usually red in color. The cargo lamp assemblies 14 are each provided with a clear lens 20.

Referring to FIG. 3, it will be seen that each cargo lamp assembly 14 includes a white LED 22 having an aperture for emitting a light beam 24 in an arc a of about 120° in a horizontal plane, about 60° to the right of a beam axis 26 and 60° to the left. The emitted beam 24 is emitted in the vertical plane (FIG. 4) about 60° above the beam axis 26 and 60° below the beam axis.

The cargo lamp assembly 14 includes the lens 20 which is provided with a configuration different in horizontal section (FIG. 3) than in vertical section (FIG. 4). The cargo lamp lens 20 reduces the arc a of the beam 24 in the horizontal plane to about 60°, about 30° to the left of the beam axis 26 and 30° to the right of the beam axis. A beam 28 emitted by the lens 20, in the horizontal plane (FIG. 3) includes a right boundary r and a left boundary l which are substantially parallel to each other.

The cargo lamp lens 20 reduces the arc a' of the beam 24 in the vertical plane (FIG. 4) to about 60°. The beam 28 emitted by the lens 20 in the vertical plane includes a top boundary t deflected downwardly about 10° relative to the horizontal plane, and a lower boundary b extending downwardly about 70° relative to the horizontal plane.

In the horizontal plane, the LED 22 is disposed at a distance d from the lens 20 which is about one-half a distance f to a focal point F of the LED, as shown in FIG. 3. In the vertical plane, the LED 22 is disposed substantially at the focal point F.

Preferably, the LED 22 is at least an 18 lumen LED and the lens 20 emits at least about 10 candela. In a combined assembly with two LEDS, each LED is preferably at least an 18 lumen LED, such that the two cargo light assemblies emit at least about 20 candela, a more than adequate lighting for pick-up truck cargo areas. Alternatively, a single 40 lumen LED, scheduled for production in 2004 or 2005, should prove useful.

If the LED 22 provides an aperture so as to emit a different arc of beam, x° to the left and x° to the right of the axis 26 in the horizontal plane and y° above and y° below the central axis 26 of the beam 24 in the vertical plane, the lens 20 reduces the arc in the horizontal plane to about ½x° to the left and ½x° to the right of the axis 26, and reduces the arc in the vertical plane defined by the upper boundary t deflected downwardly about 10° relative to the horizontal plane and the lower boundary b of about ½y°+10°.

The lens 20 may be a "Fresnel" type lens, well known in the art, configured to produce the above described arcs. A Fresnel type lens provides the advantages of reduced material requirement, ease of molding, and resulting reduced costs in manufacture.

Further, the lenses 18, 20 may be molded in one piece. The one piece lens can be all clear, inasmuch as the CHMSL LED emits red light, or can be in part clear and in part red.

There is thus provided a cargo lamp assembly for vehicles, the lamp including a white light emitting diode and a lens for appropriately configuring the beam of light emitted from the diode. There is further provided a combined assembly including at least one cargo lamp of the type aforesaid, in combination with one or more stop lamp assemblies.

It will be understood that many additional changes in the details, materials, and arrangement of parts, which have been herein described and illustrated in order to explain the nature of the invention, may be made by those skilled in the art within the principles and scope of the invention as expressed in the appended claims.

What is claimed is:

1. A combined assembly of a center high mounted stop lamp (CHMSL) assembly and a cargo lamp assembly for a vehicle, the combined assembly comprising: a housing for mounting on a rearwardly facing wall surface of a body portion of the vehicle proximate a top thereof and proximate a transverse center of the vehicle, said housing having compartments including at least one center compartment for housing CHMSL components and having a stop lamp lens, and including left and right compartments, respectively on opposite sides of the CHMSL compartment, each having a cargo light lens and a white light emitting diode (LED) for directing a beam of light to the respective cargo light lens; each of said cargo lamp assemblies comprising one of the cargo lenses and one of the LEDs, the LEDs having an aperture for emitting the light beam in an arc of about 120° in horizontal and vertical planes; and each of said cargo lenses being adapted to reduce the light beam in the horizontal plane to about 60° and reducing the light beam in the vertical plane to about 60°.

2. The combined assembly in accordance with claim 1 wherein said lenses each reduce the beam in the horizontal plane to 30° to the left of an axis of the beam and 30° to the right of the axis of the beam, and configures the beam in the vertical plane to an upper boundary deflected downwardly 10° relative to the horizontal plane and a lower boundary extending downwardly 70° relative to the horizontal plane.

3. The combined assembly in accordance with claim 2 wherein in each of said cargo lamp assemblies the LED is positioned and said lens is configured such that the LED is disposed about halfway between said lens in the horizontal plane and a focal point of said lens.

4. The combined assembly in accordance with claim 2 wherein in each of said cargo lamp assemblies the LED is positioned and said lens is configured such that the LED is disposed at about a focal point of said lens in the vertical plane.

5. The combined assembly in accordance with claim 3 wherein in each of said cargo lamp assemblies the LED is positioned and said lens is configured such that the LED is disposed at about a focal point of said lens in the vertical plane.

6. The combined assembly in accordance with claim 2 wherein the stop lens is red and the cargo lenses are clear.

7. The combined assembly in accordance with claim 6 wherein said cargo lamp LEDs are each at least 18 lumen LEDs and the cargo lenses together emit at least about 20 candela.

8. The combined assembly in accordance with claim 1 wherein the stop lamp lens and the cargo lenses comprise a unitary structure.

9. The combined assembly in accordance with claim 8 wherein said unitary lens structure is a selected one of clear or partly clear and partly red.

\* \* \* \* \*